United States Patent
Hase et al.

(10) Patent No.: US 6,475,628 B2
(45) Date of Patent: Nov. 5, 2002

(54) RESIN COMPOSITION, METHOD OF MAKING IT AND ELECTRICAL WIRE COVERED WITH IT

(75) Inventors: Tatsuya Hase, Yokkaichi (JP); Masashi Sato, Yokkaichi (JP); Hiroshi Fujimoto, Yokkaichi (JP)

(73) Assignees: Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/770,497

(22) Filed: Jan. 29, 2001

(65) Prior Publication Data

US 2002/0142175 A1 Oct. 3, 2002

(51) Int. Cl.⁷ .............................. B32B 9/04; H01B 3/22; H01B 3/28
(52) U.S. Cl. ............. 428/447; 174/110 R; 174/110 SR; 174/110 SY; 428/450; 524/430; 524/436; 524/437; 525/191; 525/222; 525/240; 525/241
(58) Field of Search ........................ 174/110 R, 110 SR, 174/110 SY; 524/430, 436, 437; 525/191, 222, 240, 241; 428/447, 450

(56) References Cited

U.S. PATENT DOCUMENTS

| | | | |
|---|---|---|---|
| 5,180,889 A | | 1/1993 | Rogers et al. |
| 5,206,284 A | * | 4/1993 | Fukui et al. ................ 524/445 |
| 5,331,046 A | * | 7/1994 | Chang et al. ................ 524/423 |
| 5,561,185 A | | 10/1996 | Hashimoto et al. |
| 5,843,577 A | * | 12/1998 | Ouhadi et al. ........... 428/474.7 |
| 6,162,548 A | * | 12/2000 | Castellani et al. .......... 428/500 |

FOREIGN PATENT DOCUMENTS

| | | |
|---|---|---|
| EP | 0 273 516 A2 | 7/1988 |
| EP | 0 331 358 A2 * | 2/1989 |
| EP | 0 993 002 A1 | 4/2000 |
| EP | 1 033 384 A2 | 9/2000 |
| JP | 01230649 A | 9/1989 |
| JP | 6-290638 | 10/1994 |
| JP | 7-78518 | 3/1995 |
| JP | 7-176219 | 7/1995 |

* cited by examiner

*Primary Examiner*—Robert Dawson
*Assistant Examiner*—Marc S Zimmer
(74) *Attorney, Agent, or Firm*—Oliff & Berridge, PLC

(57) ABSTRACT

The resin composition contains (a) 30–80 parts by weight of a polyolefin thermoplastic elastomer, (b) 1–2 parts by weight of a polypropylene modified with 0.1–10% by weight of an acid anhydride, (c) 5–50 parts by weight of a styrene-based polymeric elastomer, and (d) 10–30 parts by weight of a propylene polymer having a melt flow rate of 0.1–5 g/10 min, the total of the components (a), (b), (c) and (d) being 100 parts by weight, and (e) 30–200 parts by weight of a metal hydroxide. Optionally a silicone oil is included. This halogen-free olefin-based resin composition has a good balance of properties such as wear resistance, flame resistance, tensile property and flexibility, which are required for the covering material of an electrical wire for an automobile.

30 Claims, No Drawings

RESIN COMPOSITION, METHOD OF MAKING IT AND ELECTRICAL WIRE COVERED WITH IT

BACKGROUND OF THE INVENTION

1. Field of Invention

This invention relates to a halogen-free resin composition containing metal hydroxide, to a method of making the composition and to electrical wire having this resin composition as a covering on an electrical conductor core. Such an electrical wire is useful, for example, in a motor vehicle.

2. Description of Related Art

Polyvinyl chloride has been widely used as the covering material of electrical wire for an automobile, because it is superior in properties such as mechanical strength, extrusion processability, flexibility and coloring property. However, with recent concern for the global environment, halogen-free resin material has come to be used for the production of automobile parts including the covering of electrical wires in an automobile in place of polyvinyl chloride, because polyvinyl chloride discharges a harmful halogen gas on combustion.

A halogen-free resin composition in which a metal hydroxide is blended with a polyolefin-base polymer as a flame-retardant is known as a wear resistant resin composition having the merit of no generation of a poisonous gas such as a halogen gas on combustion (see JP-A-7-176219, JP-A-7-78518 and the like). In order that such a flame-retarding resin composition has a self-extinction property, a large quantity of a metal hydroxide is required to be added; however, this causes problems that mechanical strength such as the:wear resistance, tensile strength and the like of the composition are much reduced. In order to prevent the deterioration of mechanical strength, it may be considered that amounts of a polypropylene having a comparatively high hardness and a high density polyethylene are increased, but the flexibility of the covered electrical wire is reduced thereby and the processability becomes poor.

Various specific prior art proposals in this field will now be mentioned.

JP-A-6-290638 discloses resin compositions containing metal hydroxide for electrical wire insulation, in which the resin composition is based on polypropylene (>80%). Additional components are polyethylene modified with acid anhydride and styrene copolymer.

U.S. Pat. No. 5,561,185 describes resin composition for electrical wires containing metal hydroxide, in which the resin components are (a) 40–88.5% by weight of propylene which is 50% by weight or more of a ethylene/propylene random copolymer, (b) 1.5 to 30% by weight of a polyethylene modified with carboxylic acid derivative, e.g. maleic anhydride and (c) 10 to 48% by weight of an ethylene-series copolymer, typically ethylene/vinyl acetate copolymer.

U.S. Pat. No. 5,180,889 also describes a resin composition containing metal hydroxide as a covering of conductors in a crush resistant cable assembly. The resin components are (a) a low density copolymer of ethylene and alpha-olefin, (b) an elastomeric styrene-ethylene-butylene-styrene triblock copolymer, preferably modified with maleic anhydride and (c) optionally an impact propylene and copolymer or polypropylene. Component (a) in the examples is 50% by weight or more of the total resin components.

SUMMARY OF THE INVENTION

An object of the present invention is to provide a halogen-free olefin-based resin composition comprising a mixture of components providing a good balance of properties, for example wear resistance, flame resistance, tensile property, flexibility and the like which are required for the covering material of an electrical wire, e.g. for an automobile.

The present invention provides a resin composition containing the following resin components:
(a) 30–80 parts by weight of a polyolefin thermoplastic elastomer having a melting point of 130° C. or more and a Shore hardness of 90 or less,
(b) 1–20 parts by weight of a polypropylene modified with 0.1–10% by weight of an acid anhydride,
(c) 5–50 parts by weight of a styrene-based polymeric elastomer, and
(d) 10–30 parts by weight of a propylene polymer having a melt flow rate of 0.1 to 5 g/10 min and selected from propylene homopolymers and propylene-ethylene copolymers having a propylene content of at least 50% by weight,
wherein the total amount of the components (a), (b), (c) and (d) is 100 parts by weight and substantially no other resin component is present in the composition, and further containing
(e) 30–200 parts by weight of a metal hydroxide, based on 100 parts by weight of the resin components.

The invention also provides an electrical wire having this composition as a covering or a conductor.

DETAILED DESCRIPTION OF PREFERRED EMBODIMENTS

The respective components contained in the composition of the: present invention are carefully selected to provide the desired properties and are illustrated as follows.

The polyolefin thermoplastic elastomer (a) is preferably based on propylene and ethylene. A block copolymer of polypropylene with a propylene-ethylene rubber (for example, PER T310 and the like, which are commercially available from Tokuyama Co., Ltd.) is preferable. This type of polymer has hard segments of polypropylene and soft segments of ethylene-propylene copolymer in the molecule. The hard segment content is preferably 5–50% by weight, more preferably 15–45% by weight. An alternative preference for component (a) is an elastomeric propylene-ethylene random or block copolymer. When the melting point is less than 130° C., the heat resistance of the whole composition is inferior, and when the Shore A hardness exceeds 90, the whole composition is too hard.

The amount of component (a) is 30–80 parts by weight relative to the total polymer amount (a), (b), (c) and (d), and preferably is in the range 40–60 parts by weight. When the proportion of the polyolefin thermoplastic elastomer (a) exceeds 80 parts by weight, the wear resistance of the composition is lowered. On the other hand, when this proportion is less than 30 parts by weight, the composition becomes hard and the processability is reduced.

The component (b) is a polypropylene modified with 0.1–10% by weight of a carboxylic acid anhydride typically an unsaturated acid anhydride, for example maleic anhydride.

The amount of component (b), per 100 parts by weight of total polymer (a), (b), (c) and (d), is 1–20 parts by weight, preferably 5–20 parts by weight. When the proportion of component (b) exceeds this upper limit, it reacts intensively with the metal hydroxide, so that the tensile elongation of the composition is lowered and the flexibility of the composition is reduced. On the other hand, when its proportion is less than 1 part by weight the wear resistance of the resin composition is not improved.

The polypropylene component (b) gives the composition heat resistance, both during extrusion and if over-heating occurs in use, e.g. in an automobile.

The styrene-based polymeric elastomer, component (c), is an elastomer polymer containing styrene monomer units. Preferably the styrene-based polymer has the structure of a block copolymer of styrene monomers and olefin monomers. This polymeric elastomer may be modified with 0.1–10% by weight of carboxylic acid anhydride, typically unsaturated acid anhydride, e.g. maleic anhydride. A preferred example of the styrene-based elastomer (not modified with acid anhydride or so modified) is a polymer obtained by block-copolymerizing styrene with butadiene, and saturating double bonds of the resulting block-copolymer by hydrogenation (known as SEBS). Typically the ratio of the styrene/butadiene is in the range 3/7 to 2/8 by weight. Alternatively there is used, for example, a styrene-based elastomer obtained by block polymerizing styrene and isoprene and hydrogenating the double bonds of the block copolymer (this product can be regarded as polystyrene-poly (ethylene-propylene)-polystyrene, and is known as SEPS).

The amount of component (c) per 100 parts by weight of total polymer (a), (b), (c) and (d) in the composition is 5–50 parts by weight, preferably 10–30 parts by weight. When the proportion of component (c) exceeds 50 parts by weight, the wear resistance of the composition is not improved. On the other hand, when its proportion is less than 5 parts by weight, the flexibility of the composition is inferior.

As the propylene polymer, component (d), propylene-based polymers are used, for example a propylene homopolymer or a propylene-ethylene copolymer of block or random type whose main monomer component (more than 50% by weight) is propylene. The propylene polymer (d) has a melt flow rate (MFR) of 0.1–5 g/10 min. MFR is measured in accordance with JIS K6921-2, the entire disclosure of which is incorporated herein by reference. Examples of the propylene polymer of MFR 0.1 to 5 g/10 min are RB610A, RB410, RB110 and the like, which are commercially available from Tokuyama Co., Ltd. MFR is indicative of molecular length. The preferred range of 0.1–5 g/10 min achieves good cold weather performance, particularly avoidance of cracking. As described in JIS K6921-2, melt flow rate is measured using a load of 2.16 kgf at 230° C.

The amount of component (d), per 100 parts by weight of total polymer (a), (b), (c) and (d), in the composition is 10–30 parts by weight, preferably 20–30 parts by weight. When the amount of component (d) exceeds 30 parts by weight, the flexibility of the composition is poor and processing becomes difficult. On the other hand, when the proportion of component (d) is less than 10 parts by weight, the wear resistance of the composition may be reduced.

Magnesium hydroxide, aluminum hydroxide and the like can be used as the metal hydroxide (e). It is preferable that the particles of metal hydroxide are surface-treated with a coupling agent, particularly a silane coupling agent (for example, an aminosilane coupling agent, a vinylsilane coupling agent, an epoxysilane coupling agent, etc.) and optionally a surface-treating agent such as a higher aliphatic acid (for example, stearic acid, oleic acid, etc.) or the like. The silane coupling agent typically contains Si—O linkages which bond to the hydroxide. Magnesium hydroxide or aluminum hydroxide surface-treated with an amino-silane coupling agent is preferred in particular.

The amount of the metal hydroxide per 100 parts by weight of total polymer (a), (b), (c) and (d) in the composition is in the range 30–200 parts by weight, preferably 50–150 parts by weight and more preferably 70–100 parts by weight. When the amount of the metal hydroxide is too large, the elongation of the composition is deteriorated and the wear resistance, flexibility and processability are poor. On the other hand, when the amount of the metal hydroxide is too small, the flame resistance of the composition is reduced.

Optionally, there may be included a silicone oil, which typically is a high molecular weight silicone polymer but is liquid at room temperature (20° C.), and which may be added into the resin composition as a blend with a synthetic resin carrier (this resin carrier is in this case preferably an additional resin component, not comprised in the components (a), (b), (c) and (d)). The amount of resin carrier, if present, is selected to achieve the desired processability when handling the oil and incorporating it in the mixture, and may be in the range 30–70%, more preferably 40–60%, by weight of the blend of silicone oil and carrier resin.

The type of the resin used as the carrier resin is not specifically limited, but a polypropylene, a low density polyethylene, a linear low density polyethylene, a general purpose polystyrene (GPPS), a high impact polystyrene, a polyamide 6, a polyamide 66, a polyoxymethylene, an ABS resin, a polybutylene terephthalate, a polyethylene terephthalate, an ethylene-methyl methacrylate copolymer and the like are suitable examples. These can be used alone or as a mixture of two or more.

Such a silicone oil mixed with a resin is commercially available as "Si concentrate" from Toray-Dow Corning Silicone Co., Ltd., with the following resin components and product numbers:

Polypropylene-base: BY27-001, BY27-201, BY27-201C.
Low density polyethylene-base: BY27-002.
Linear low density polyethylene-base: BY27-202.
General purpose polystyrene: BY27-003.
High impact polystyrene: BY27-004.
Polyamide 6-base: BY27-011.
Polyamide 66-base: BY27-005.
Polyoxymethylene-base: BY27-006.
ABS resin-base: BY29-007.
Polybutyrene terephthalate-base: BY27-009.
Polyethylene terephthalate-base: BY27-112.
Ethylene-methyl methacrylate copolymer-base: BY27-202M.

The amount of the silicone oil, based on the total amount of the components (a)–(e) is 0.5–5% by weight or less, preferably at least 1%.

When the amount of silicone oil is within the range 1–5%, the: conductor-drawing force (measured as described below) of the resin composition is acceptable and the flexibility is improved. Further, the surface-lubricity of the resin composition is improved and the wear resistance is remarkably improved.

All of the components (a), (b), (c) and (d) are selected to be halogen-free. Synthetic resin components other than (a), (b), (c) and (d) are substantially, and preferably completely, absent, except in the case where the carrier resin for the silicone oil is present, as described above. The components (a), (b), (c) and (d) are selected to be all different from each other.

Compounding agents usually included in an olefin-based resin composition, for example an oxidation inhibitor, a copper inhibitor, a lubricant and the like may be added in the resin composition of the present invention in amounts which do not unacceptably reduce the above-mentioned properties. These and other conventional additives will be readily apparent to those of ordinary skill in the The resin composition of the present invention can be prepared by mixing and kneading the above-mentioned respective components by conventional methods.

The method of covering an electrical wire, particularly an electrical wire for a motor vehicle such as an automobile, by the resin composition of the present invention may similarly be performed by a conventional method.

The resin composition of the present invention when used as the covering material of an electrical wire, e.g. for an automobile, can well satisfy requirements for properties such as wear resistance, flame resistance, tensile property, flexibility, heat resistance, cold resistance and the like.

In particular, when as preferred the metal hydroxide particles are surface-treated with an amino-silane coupling agent, the coupling agent bonds the metal hydroxide with the acid anhydride. The coupling agent has a functional group reacting with the inorganic hydroxide and a functional group reacting with the organic acid anhydride. Also, the epoxysilane and vinylsilane coupling agents, if used, have affinity to the hydroxide and the anhydride. Accordingly, the wear resistance of the resin composition is remarkably improved. Further, when an amino group is present on the lipophilic side of the silane coupling agent molecule, the reaction with the polyolefin modified with an acid anhydride can advantageously suppress the hydrophilic property of the amino group.

EXAMPLES

The present invention is more specifically illustrated by the following non-limiting Examples and Comparative Examples.

Examples 1–2 and Comparative Examples 1–5

The components shown in Tables 1 and 2 are mixed at the amounts shown (parts by weight), and kneaded at 250–260° C. by a twin-screw extruder. Each composition obtained was extrusion-molded at a covering thickness of 0.3 mm around a conductor (twisted wire that consists of 7 soft copper wires, each having a diameter of 0.32 mm) having a cross-section of 0.5 mm$^2$. A die having a diameter of 1.6 mm and a nipple having a diameter of 1.0 mm were used for extrusion molding. The extrusion temperature was 220–230° C. for the die and 200–250° C. for the cylinders, and the extrusion molding was carried out at a linear velocity of 100 m/min.

The meaning of the abbreviations in the tables is as follows:

PP/EPR elastomer: a block copolymer with segments of polypropylene and a propylene-ethylene rubber (PER T310J manufactured by Tokuyama Co., Ltd.). This has a propylene segment content of 30% by weight, a melting point above 130° C. and a Shore hardness of less than 90.

MAH-PP: a polypropylene modified with 1% by weight of maleic anhydride.

SEBS: a styrene-based elastomer obtained by saturating the double bonds of a block copolymer of styrene and butadiene by hydrogenation (TUFTECH H1041 manufactured by Asahi Chemical Co., Ltd.).

Propylene BP: a propylene-ethylene block copolymer with MFR of 0.5 g/10 min. (RB610A manufactured by Tokuyama Co., Ltd.) having a propylene monomer content of more than 50% by weight.

MAGNIFIN H51V: magnesium hydroxide surface-treated with an aminosilane coupling agent (manufactured by Alusuisse Martinswerk gmbh).

As an antioxidant, a hindered phenol-based antioxidant (trade mark "TOMINOX TT" manufactured by Yoshitomi Fine Chemicals Ltd.) was used.

The flame resistance, tensile strength, elongation and wear resistance in Examples 1 and 2 and Comparative Examples 1–5 were measured in accordance with JASO (Japan Automobile Standards Organization) D 611, the entire disclosure of which is incorporated herein by reference. The wear resistance is an average of 3 samples, and 300 cycles or more is deemed acceptable.

The flexibility was evaluated by touch when the electrical wire was folded.

The processability was evaluated by the presence of whisker formation at peeling at the terminal of the electrical wire.

The results are shown in Tables 1 and 2, where the amounts of the components are given in parts by weight and the unit of MFR is g/10 min.

TABLE 1

|  | MFR | Example 1 | Example 2 |
|---|---|---|---|
| PP/EPR elastomer | 1.5 | 50 | 60 |
| MAH-PP | 20.0 | 10 | 20 |
| SEBS | 5.0 | 20 | 10 |
| Propylene BP | 0.5 | 20 | 10 |
| MAGNIFIN H51V |  | 90 | 110 |
| Antioxidant |  | 1 | 1 |
| Total |  | 191 | 211 |
| Flame resistance |  | good | good |
| Tensile strength (MPa) |  | 27.6 | 22.3 |
| Tensile elongation (%) |  | 290 | 480 |
| Wear resistance (cycle) |  | 350 | 330 |
| Flexibility |  | good | good |
| Processability |  | good | good |

TABLE 2

|  | MFR | Comparative Example 1 | Comparative Example 2 | Comparative Example 3 | Comparative Example 4 | Comparative Example 5 |
|---|---|---|---|---|---|---|
| PP/EPR elastomer | 1.5 | 60 | 50 | 10 | 90 | 20 |
| MAH-PP | 20.0 | — | 20 | 10 | 5 | 40 |
| SEBS | 5.0 | 10 | — | 70 | 5 | 20 |
| Propylene BP | 0.5 | 30 | 30 | 10 | — | 20 |
| MAGNIFIN H51V |  | 90 | 150 | 90 | 90 | 180 |
| Antioxidant |  | 1 | 1 | 1 | 1 | 1 |
| Total |  | 191 | 251 | 191 | 191 | 281 |
| Flame resistance |  | good | good | good | good | good |
| Tensile strength (MPa) |  | 22.4 | 30.2 | 20.4 | 19.1 | 30.4 |
| Tensile elongation (%) |  | 550 | 320 | 570 | 530 | 120 |
| Wear resistance (cycle) |  | 100 | 410 | 60 | 60 | 350 |
| Flexibility |  | good | bad | good | good | bad |
| Processability |  | bad | good | good | bad | good |

Comparative Example 1 shows that, when the polyolefin modified with an acid anhydride is not added, the wear resistance and processability of the resin composition are poor.

Comparative Example 2 shows that, when the styrene-based elastomer is not added, the flexibility of the resin composition is poor.

Comparative Example 3 shows that, when the styrene-based elastomer is in excess, the wear resistance of the resin composition is low.

Comparative Example 4 shows that, when the polyolefin thermoplastic elastomer is in excess, the wear resistance and processability of the resin composition are poor.

Comparative Example 5 shows that, when the polyolefin modified with an acid anhydride and magnesium hydroxide are in excess, the tensile elongation of the resin composition becomes small, and the flexibility is low.

TABLE 3-continued

|  | MFR | Example 3 | Example 4 |
|---|---|---|---|
| MAGNIFIN H51V |  | 90 | 110 |
| Antioxidant |  | 1 | 1 |
| Total |  | 191 | 211 |
| Flame resistance |  | good | good |
| Tensile strength (MPa) |  | 29.3 | 28.0 |
| Tensile elongation (%) |  | 380 | 310 |
| Wear resistance (cycle) |  | 400 | 430 |
| Flexibility |  | good | good |
| Processability |  | good | good |

TABLE 4

|  | MFR | Comparative Example 6 | Comparative Example 7 | Comparative Example 8 | Comparative Example 9 | Comparative Example 10 |
|---|---|---|---|---|---|---|
| PP/EPR elastomer | 1.5 | 40 | 50 | 10 | 90 | 20 |
| MAH-PP | 20 | — | 20 | 10 | 5 | 40 |
| MAH-SEBS | 5 | 30 | — | 70 | 5 | 20 |
| Propylene BP | 0.5 | 30 | 30 | 10 | — | 20 |
| MAGNIFIN H51V |  | 90 | 150 | 90 | 90 | 180 |
| Antioxidant |  | 1 | 1 | 1 | 1 | 1 |
| Total |  | 191 | 251 | 191 | 191 | 281 |
| Flame resistance |  | good | good | good | good | good |
| Tensile strength (MPa) |  | 24.1 | 28.2 | 23.4 | 17.4 | 38.4 |
| Tensile elongation (%) |  | 430 | 420 | 540 | 580 | 100 |
| Wear resistance (cycle) |  | 200 | 370 | 130 | 110 | 630 |
| Flexibility |  | good | bad | good | good | bad |
| Processability |  | good | good | good | bad | good |

Examples 3 and 4 and Comparative Examples 6–10

The components shown in Tables 3 and 4 are mixed in the amounts shown, and kneaded at 250–260° C. by a twin-screw extruder.

The composition obtained was extrusion-molded at a covering thickness of 0.3 mm around a conductor (twisted wire which consists of 7 soft copper wires, each having a diameter of 0.32 mm) having a cross-section of 0.5 mm$^2$. A die having a diameter of 1.6 mm and a nipple having a diameter of 1.0 mm were used for extrusion molding. The extrusion temperature was 210–230° C. for the die and 200–240° C. for the cylinders, and the extrusion molding was carried out at a linear velocity of 100 m/min.

The meanings of abbreviations in Tables 3 and 4 are as in Examples 1 and 2 and additionally as follows:

MAH-SEBS: a styrene-based elastomer obtained by saturating the double bonds of a block copolymer of styrene and butadiene by hydrogenation, which is modified with 1% by weight of maleic anhydride (TUFTECH M1913 manufactured by Asahi Chemical Co., Ltd.).

The antioxidant was the same as in Examples 1 and 2.

The flame resistance, tensile strength, elongation and wear resistance were measured as in the preceding examples. Flexibility and processability were evaluated as in the preceding examples.

The results are shown in Tables 3 and 4. All MFR values given are g/10 min.

TABLE 3

|  | MFR | Example 3 | Example 4 |
|---|---|---|---|
| PP/EPR elastomer | 1.5 | 50 | 60 |
| MAH-PP | 20 | 10 | 20 |
| MAH-SEBS | 5 | 20 | 10 |
| Propylene BP | 0.5 | 20 | 10 |

The result of Comparative Example 6 shows that, when the polyolefin modified with an acid anhydride is not added, the wear resistance of the resin composition is poor.

The result of Comparative Example 7 shows that, when the styrene-based elastomer modified with an acid anhydride is not added, the flexibility of the resin composition is poor.

The result of Comparative Example 8 shows that, when the styrene-based elastomer modified with an acid anhydride is added in excess, the wear resistance of the resin composition is low.

Comparative Example 9 shows that, when the polyolefin thermoplastic elastomer is in excess, the wear resistance and processability of the resin composition are poor.

Comparative Example 10 shows that, when the polyolefin modified with an acid anhydride is in excess, the tensile elongation of the resin composition is small, and the flexibility is poor.

Examples 5 and 6 and Comparative Examples 11–15

The components shown in Tables 5 and 6 are mixed at the amounts shown (parts by weight, except that the Si-concentrate is % by weight), and kneaded at 250–260° C. by a twin-screw extruder.

The composition obtained was extrusion-molded at a covering thickness of 0.3 mm around a conductor (twisted wire which consists of 19 soft copper wires, each having a diameter of 0.29 mm) having a cross-section of 1.25 mm$^2$. A die having a diameter of 2.1 mm and a nipple having a diameter of 1.5 mm were used for extrusion molding. The extrusion temperature was 210–230° C. for the die and 200–240° C. for the cylinders, and the extrusion molding was carried out at a linear velocity of 100 m/min.

The meaning of the abbreviations in Tables 5 and 6 are the same as in the preceding examples, and additionally:

Si-concentrate: a blend of 50 parts by weight of a polypropylene as carrier resin and 50 parts by weight of a silicone oil (BY27-001).

The flame resistance and wear resistance in Examples 5 and 6 and Comparative Examples 11–15 were measured in accordance with JASO D 611. Here, a wear resistance of 500 cycles or more is judged as acceptable.

The conductor-drawing force was measured as follows:

A sample having a length of 120 mm is cut out from the covered electric wire, and the cover is peeled from one end, leaving 50 mm still covered. A bat plate having an aperture slightly bigger than the diameter of the conductor is installed in a tensile tester, and the conductor portion whose cover has been peeled is passed through it. A maximum load when the conductor is drawn out at a drawing speed of 200 mm/min. is measured and defined as the conductor-drawing force.

The flexibility and processability were evaluated as in the preceding examples.

The results are shown in Tables 5 and 6.

TABLE 5

|  | MFR | Example 5 | Example 6 |
| --- | --- | --- | --- |
| PP/EPR elastomer | 1.5 | 50 | 60 |
| MAH-PP | 20 | 10 | 20 |
| MAH-SBBS | 5 | 20 | 10 |
| Propylene BP | 0.5 | 20 | 10 |
| MAGNIFIN H51V |  | 90 | 110 |
| Antioxidant |  | 1 | 1 |
| Si-concentrate (wt %) |  | 5% | 2% |
| Flame resistance |  | good | good |
| Conductor-drawing force (N) |  | 12 | 18 |
| Wear resistance (cycle) |  | 2000 | 1300 |
| Flexibility |  | good | good |
| Processability |  | good | good |

TABLE 6

|  | MFR | Comparative Example 11 | Comparative Example 12 | Comparative Example 13 | Comparative Example 14 | Comparative Example 15 |
| --- | --- | --- | --- | --- | --- | --- |
| PP/EPR elastomer | 1.5 | 40 | 50 | 10 | 90 | 20 |
| MAH-PP | 20 | — | 20 | 10 | 5 | 40 |
| MAH-SEBS | 5 | 30 | — | 70 | 5 | 20 |
| Propylene BP | 0.5 | 30 | 30 | 10 | — | 20 |
| MAGNIFIN H51V |  | 90 | 150 | 90 | 90 | 180 |
| Antioxidant |  | 1 | 1 | 1 | 1 | 1 |
| Si-concentrate (wt %) |  | 1% | — | 2% | 1% | — |
| Flame resistance |  | good | good | good | good | good |
| Conductor-drawing force N |  | 19 | 28 | 18 | 24 | 30 |
| Wear resistance (cycle) |  | 350 | 900 | 300 | 150 | 700 |
| Flexibility |  | good | bad | good | good | bad |
| Processability |  | bad | good | good | bad | good |

From the results of Examples 5 and 6, it is seen that the wear resistance of the resin composition can be further improved by adding the silicone oil (Si-concentrate) (compare Examples 3 and 4).

The result of Comparative Example 11 shows that, when the polyolefin modified with an acid anhydride is not added, the wear resistance of the resin composition is poor, even though the silicone oil is included.

Comparative Example 12 shows that, when the styrene-based elastomer is not added, the flexibility of the resin composition is damaged, although the wear resistance is good.

Comparative Example 13 shows that, when the styrene-based elastomer is added in excess, the wear resistance of the resin composition is low, even though the silicone oil is added.

Comparative Example 14 shows that, when the polyolefin thermoplastic elastomer is added in excess, the wear resistance and processability of the resin composition are poor.

Comparative Example 15 shows that, when the polyolefin modified with an acid anhydride is added in excess, the flexibility of the resin composition is low.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A resin composition comprising the following resin components:
   (a) 30–80 parts by weight of a polyolefin thermoplastic elastomer having a melting point of at least 130° C. and a Shore A hardness of not more than 90,
   (b) 1–20 parts by weight of a polypropylene modified with 0.1–10% by weight of an acid anhydride,
   (c) 5–50 parts by weight of a styrene-based polymeric elastomer, and
   (d) 10–30 parts by weight of a propylene polymer, having a melt flow rate of 0.1–5 g/10 min, measured using a load of 2.16 kgf at 230° C., and selected from propylene homopolymers and propylene-ethylene copolymers having a propylene content of at least 50% by weight,
   wherein a total amount of the components (a), (b), (c) and (d) is 100 parts by weight and provided that substantially no other resin component is present in the composition,
   and further comprising
   (e) 30–200 parts by weight of a metal hydroxide, based on 100 parts by weight of the resin components.

2. A resin composition according to claim 1, wherein component (b) is a polypropylene modified with maleic anhydride.

3. A resin composition according to claim 1, wherein component (c) is one of a hydrogenated styrene-butadiene copolymer and a hydrogenated styrene-isoprene copolymer.

4. A resin composition according to claim 1, wherein component (c) is a styrene-based polymeric elastomer modified with 0.1–10% by weight of an acid anhydride.

5. A resin composition according to claim 1, wherein component (d) is selected from the group consisting of a propylene homopolymer, a propylene-ethylene random copolymer and a propylene-ethylene-propylene block copolymer.

6. A resin composition according to claim 1, wherein the metal hydroxide (e) is selected from magnesium hydroxide and aluminum hydroxide and is surface-treated with a silane coupling agent.

7. A resin composition according to claim 6, wherein said coupling agent is selected from aminosilane, vinylsilane and epoxysilane coupling agents.

8. A resin composition according to claim 1, further containing a silicone oil in an amount of 0.5 to 5% by weight based on the total weight of components (a), (b), (c), (d) and (e).

9. A resin composition according to claim 8, wherein component (c) is a styrene-based polymeric elastomer modified with 0.1–10% by weight of an acid anhydride.

10. A resin composition according to claim 8, modified by the presence of, in addition to said resin components (a), (b), (c) and (d), a synthetic resin acting as a carrier for said silicone oil.

11. A method of preparing a resin composition, comprising thoroughly mixing the following components:
   (a) 30–80 parts by weight of a polyolefin thermoplastic elastomer having a melting point of at least 130° C. and a Shore A hardness of not more than 90,
   (b) 1–20 parts by weight of a polypropylene modified with 0.1–10% by weight of an acid anhydride,
   (c) 5–50 parts by weight of a styrene-based polymeric elastomer,
   (d) 10–30 parts by weight of a propylene polymer, having a melt flow rate of 0.1–5 g/10 min, measured using a load of 2.16 kgf at 230° C., and selected from propylene homopolymers and propylene-ethylene copolymers having a propylene content of at least 50% by weight, and
   (e) 30–200 parts by weight of a metal hydroxide, based on 100 parts by weight of the resin components,
      wherein a total amount of components (a), (b), (c) and (d) is 100 parts by weight and provided that substantially no other resin component is included in the composition.

12. A method according to claim 11, wherein component (b) is a polypropylene modified with maleic anhydride.

13. A method according to claim 11, wherein component (c) is one of a hydrogenated styrene-butadiene copolymer and a hydrogenated styrene-isoprene copolymer.

14. A method according to claim 11, wherein component (c) is a styrene-based polymeric elastomer modified with 0.1–10% by weight of an acid anhydride.

15. A method according to claim 11, wherein component (d) is selected from the group consisting of a propylene homopolymer, a propylene-ethylene random copolymer and a propylene-ethylene-propylene block copolymer.

16. A method according to claim 11, wherein the metal hydroxide (e) is selected from magnesium hydroxide and aluminum hydroxide and is surface-treated with a silane coupling agent.

17. A method according to claim 16, wherein said coupling agent is selected from aminosilane, vinylsilane and epoxysilane coupling agents.

18. A method according to claim 11, comprising including in the composition a silicone oil in an amount of 0.5 to 5% by weight based on the total weight of components (a), (b), (c), (d) and (e).

19. A method according to claim 18, wherein component (c) is a styrene-based polymeric elastomer modified with 0.1–10% by weight of an acid anhydride.

20. A method according to claim 18, modified by including in the composition, in addition to said resin components (a), (b), (c) and (d), a synthetic resin acting as a carrier for said silicone oil.

21. An electrical wire having an electrically conductive core and a covering on the core composed of a resin composition comprising the following resin components:
   (a) 30–80 parts by weight of a polyolefin thermoplastic elastomer having a melting point of at least 130° C. and a Shore A hardness of not more than 90,
   (b) 1–20 parts by weight of a polypropylene modified with 0.1–10% by weight of an acid anhydride,
   (c) 5–50 parts by weight of a styrene-based polymeric elastomer, and
   (d) 10–30 parts by weight of a propylene polymer, having a melt flow rate of 0.1–5 g/10 min, measured using a load of 2.16 kgf at 230° C., and selected from propylene homopolymers and propylene-ethylene copolymers having a propylene content of at least 50% by weight,
      wherein a total amount of the components (a), (b), (c) and (d) is 100 parts by weight and provided that substantially no other resin component is present in the resin composition,
   said resin composition further comprising
   (e) 30–200 parts by weight of a metal hydroxide, based on 100 parts by weight of the resin components.

22. An electrical wire according to claim 21, wherein component (b) is a polypropylene modified with maleic anhydride.

23. An electrical wire according to claim 21, wherein component (c) is one of a hydrogenated styrene-butadiene copolymer and a hydrogenated styrene-isoprene copolymer.

24. An electrical wire according to claim 21, wherein component (c) is a styrene-based polymeric elastomer modified with 0.1–10% by weight of an acid anhydride.

25. An electrical wire according to claim 21, wherein component (d) is selected from the group consisting of a propylene homopolymer, a propylene-ethylene random copolymer and a propylene-ethylene-propylene block copolymer.

26. An electrical wire according to claim 21, wherein the metal hydroxide (e) is selected from magnesium hydroxide and aluminum hydroxide and is surface-treated with a silane coupling agent.

27. An electrical wire according to claim 21, wherein said coupling agent is selected from aminosilane vinylsilane and epoxysilane coupling agents.

28. An electrical wire according to claim 21, wherein said resin composition further contains a silicone oil in an amount of 0.5 to 5% by weight based on the total weight of components (a), (b), (c), (d) and (e).

29. An electrical wire according to claim 28, wherein component (c) is a styrene-based polymeric elastomer modified with 0.1–10% by weight of an acid anhydride.

30. An electrical wire according to claim 28, wherein said resin composition is modified by the presence of, in addition to said resin components (a), (b), (c) and (d), a synthetic resin acting as a carrier for said silicone oil.

* * * * *